(12) United States Patent
Leute et al.

(10) Patent No.: US 12,259,232 B2
(45) Date of Patent: Mar. 25, 2025

(54) METHOD AND INSPECTION DEVICE FOR OPTICALLY INSPECTING A SURFACE

(71) Applicant: ISRA VISION GMBH, Darmstadt (DE)

(72) Inventors: Stefan Leute, Herten (DE); Koichi Harada, Kanagawa (JP)

(73) Assignee: ISRA VISION GMBH, Darmstadt (DE)

( * ) Notice: Subject to any disclaimer, the term of this patent is extended or adjusted under 35 U.S.C. 154(b) by 143 days.

(21) Appl. No.: 17/917,812

(22) PCT Filed: Mar. 22, 2021

(86) PCT No.: PCT/EP2021/057217
§ 371 (c)(1),
(2) Date: Oct. 7, 2022

(87) PCT Pub. No.: WO2021/204521
PCT Pub. Date: Oct. 14, 2021

(65) Prior Publication Data
US 2023/0140278 A1    May 4, 2023

(30) Foreign Application Priority Data
Apr. 9, 2020   (DE) .................... 10 2020 109 945.2

(51) Int. Cl.
*G01B 11/25*       (2006.01)
*G01N 21/88*       (2006.01)

(52) U.S. Cl.
CPC ...... *G01B 11/2513* (2013.01); *G01B 11/2518* (2013.01); *G01N 21/8806* (2013.01)

(58) Field of Classification Search
CPC ............ G01B 11/2513; G01B 11/2518; G01B 11/2522; G01B 11/2527; G01N 21/8806
See application file for complete search history.

(56) References Cited

U.S. PATENT DOCUMENTS

| 6,392,754 B1 | 5/2002 | Pingel et al. |
| 8,125,563 B2 | 2/2012 | Wagner |

(Continued)

FOREIGN PATENT DOCUMENTS

| DE | 10063293 | 7/2002 |
| DE | 102004033526 | 2/2006 |

(Continued)

OTHER PUBLICATIONS

PCT International Search Report for International Application No. PCT/EP2021/057217, mailed Jun. 22, 2021, 5pp.

(Continued)

*Primary Examiner* — Hung V Nguyen
(74) *Attorney, Agent, or Firm* — The Roy Gross Law Firm, LLC; Roy Gross

(57) ABSTRACT

Methods for optically inspecting a surface (10) of an object (1) and an inspection device (9) including are described. With the method a temporally periodic pattern (13) with different illumination patterns (130) is generated on the surface (10) via a illumination device (8) of the inspection device (9) during an image recording sequence (13), and in the image recording sequence a number of images of the pattern (13) on the surface (10) are recorded via an image recording device (7) of the inspection device (9), wherein generating one of the different illumination patterns (130) is synchronised, respectively, with the image recording of one of the images of the pattern (13), the phase of the pattern (13) is determined from the succession of the recorded known illumination patterns (130) in at least one image point and defects (4, 5) on the surface (10) are detected from deviations of the recorded illumination pattern (130) from the generated known illumination pattern (130).

12 Claims, 9 Drawing Sheets

(56) References Cited

U.S. PATENT DOCUMENTS

Figure 1:
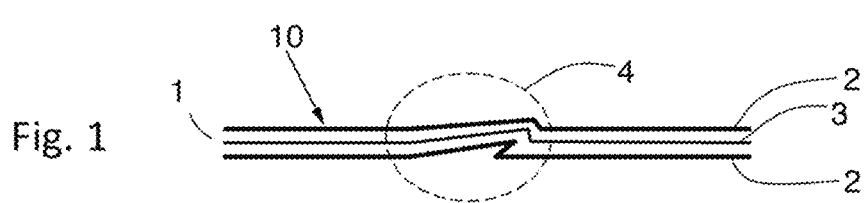

| | | | |
|---|---|---|---|
| 10,184,789 B2* | 1/2019 | Sasaki | G01N 21/8851 |
| 10,591,285 B2* | 3/2020 | Ando | G06T 7/0004 |
| 11,619,591 B2* | 4/2023 | Kato | G01B 11/2513 |
| | | | 356/141.1 |
| 11,885,612 B2* | 1/2024 | D?ge | G01S 17/48 |
| 2006/0221198 A1 | 10/2006 | Fry et al. | |
| 2008/0247630 A1 | 10/2008 | Horiuchi | |
| 2011/0069320 A1 | 3/2011 | Miyake | |
| 2012/0293700 A1 | 11/2012 | Drouin et al. | |
| 2018/0347970 A1 | 12/2018 | Sasaki | |
| 2019/0212275 A1 | 7/2019 | Nozawa et al. | |

FOREIGN PATENT DOCUMENTS

| | | |
|---|---|---|
| DE | 102011117894 | 5/2013 |
| EP | 2390656 | 11/2011 |
| JP | 2008145226 A | 6/2008 |
| JP | 2010256021 A | 11/2010 |
| JP | 2011064482 | 3/2011 |
| JP | 2011089981 A | 5/2011 |
| JP | 2012053015 A | 3/2012 |
| JP | 2018205005 A | 12/2018 |
| JP | 2019120644 A | 7/2019 |
| WO | 09817971 | 4/1998 |
| WO | 2007054332 | 5/2007 |

OTHER PUBLICATIONS

PCT Written Opinion for International Application No. PCT/EP2021/057217, mailed Jun. 22, 2021, 14pp.
PCT International Preliminary Report on Patentability for International Application No. PCT/EP2021/057217, issued Oct. 6, 2022, 18 pp.
Gorthi and Rastogi, Fringe Projection Techniques: Whither we are?, Proc. Optics and Lasers in Engineering, 48(2):133-140, 2010.

* cited by examiner

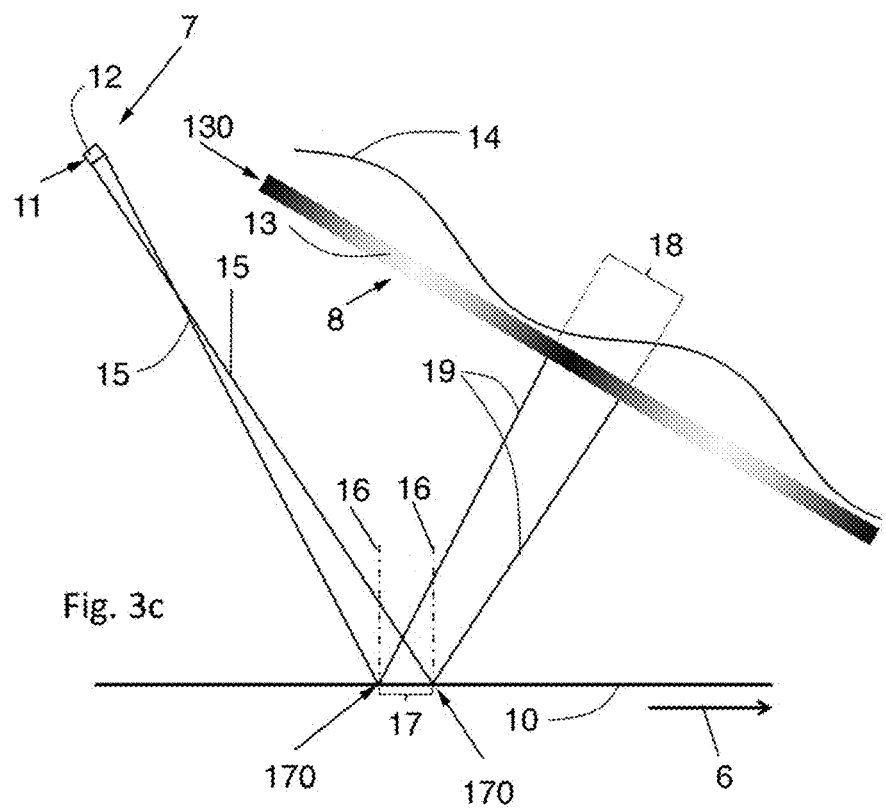
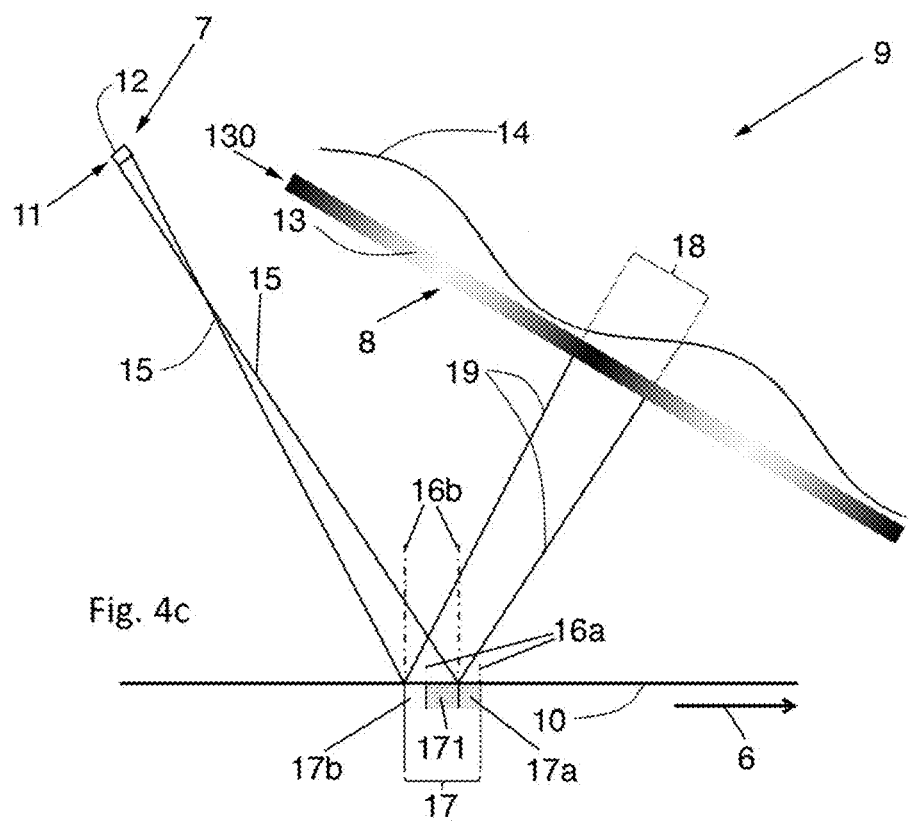

METHOD AND INSPECTION DEVICE FOR OPTICALLY INSPECTING A SURFACE

CROSS REFERENCE TO RELATED APPLICATIONS

This application is a National Phase of PCT Patent Application No. PCT/EP2021/057217 having International filing date of Mar. 22, 2021, which claims the benefit of priority of German Patent Application No. 10 2020 109 945.2, filed Apr. 9, 2020, the contents of which are all incorporated by reference herein in their entirety.

The invention relates to a method and an inspection device for the optical inspection of a surface of an object, as well as to an advantageous use of the method and the inspection device. When using the method a temporally periodic pattern with different illumination patterns is generated on the surface during an image recording sequence by means of an illumination device of the inspection device. In/during the image recording sequence a number of images of the pattern on the surface are recorded by means of an image recording device of the inspection device.

During this process generating one of the different illumination patterns is synchronised, respectively, with the image recording of one of the images of the pattern in such a way that each image from the image recording sequence is recorded, respectively, with a known illumination pattern of the different illumination patterns. In other words this means that exactly one illumination pattern is visible in each camera image. By synchronising image recording and pattern generation it is achieved, in particular, that the illumination pattern does not change during the exposure time of an image recording. From the succession of the recorded known illumination patterns the phase of the pattern is determined in at least one image point. Because the pattern/the periodically different illumination patterns of the pattern are known, the image point can be associated with a point of the known pattern. On the surface defects are detected from deviations of the illumination pattern recorded in at least one image from the generated known illumination pattern. Defects on the surface lead to distortions of the known pattern/the one known illumination pattern recorded in the one image. This makes it possible to identify and output the defects by means of an image evaluation basically known to the expert using suitable algorithms, e.g. by means of an appropriately suitable computing device. By scanning several surface areas one after the other, i.e. by repeated application on different areas of the surfaces, the entire surface or selected portions of the surface can be inspected.

During surface inspection one of the most important tasks consists in detecting and classifying defects, which due to their topographic characteristics cause light deflections. These defects are often not at all perceived by the eye as topographic defects but merely as changes in brightness or nuances on the surface. Often an inspection during movement is necessary or at least advantageous. Especially preferred applications for such surfaces in terms of this invention will be described at a later stage.

In principle the method according to the invention is suitable for the optical inspection of reflecting surfaces. Reflecting surfaces in terms of the invention include both ideally reflecting (i.e. mirroring) surfaces and surfaces, which in addition to reflecting properties also exhibit a certain scattering effect. The criterion here is that a surface illuminated with a pattern (including also a pattern projected onto the surface) is optically recordable in an image.

A long established method for the inspection of surfaces is deflectometry. This involves recording an image of the reflection of a known pattern on the surface by means of a camera and evaluating it in a computer. Defects in the surface lead to distortions in the pattern on the surface, which are detected. If the recording geometry and the pattern geometry are known, this can also be used to determine a 3D topography of the surface. Various methods of how this is performed are known to the expert. These are regarded as known in terms of the invention and will no longer be described in detail.

The basic principle of deflectometry consists in determining the deflection of a light ray incident on the surface, in that the point in the pattern is identified, on which the visual ray emanating from a camera (recording device) and mirrored on the surface is incident. In other words the deflection of the visual ray on the surface is determined in reflection, which depends on the direction of the surface normal (a straight standing vertically on the surface in the reflection point) in the corresponding spot (reflection point). From the thus determined normal field the topography of the surface can then be determined by e.g. integration.

Commonly used methods for locating a point are so-called phase shift methods, in which the pattern used is a periodic pattern and a determination is made, in which phase position of the pattern the point to be determined is located.

This is different in principle from methods, for which one image of the pattern is sufficient or which require several images.

Methods for which one image is sufficient have the advantage that these can also be used on a moving surface and thus appear to be initially more suitable for inspection of e.g. web product or in production processes. They have, however, the disadvantage that they are more susceptible to defects or require a second physically present pattern in the beam path. The WO 98/17971 A1 e.g. has disclosed a method of how smallest beam deviations can be detected and determined. In essence a stripe pattern is monitored here with a camera. For the described method a single image is sufficient, because the pixel grid of the camera is used as the second pattern. However, the disadvantage here is that camera and pattern require very precise adjustment. In the industrial environment such as in production processes this is very difficult to achieve or only at unjustifiable expense.

Methods which operate with a number of images are substantially more robust against defects and do not require time-consuming adjustment. The pattern is displayed and recorded consecutively in several phase positions shifted relative to one another. A particularly simple evaluation results if a stripe pattern with sinusoidal brightness curve is used, which is recorded four times with a shift of a quarter period length respectively. But other patterns and successions of patterns are also possible. From the succession of the grey values in each pixel then results the phase position within the pattern. This method is comprehensively described in relevant textbooks and articles (e.g. Gorthi and Rastogi, Fringe Projection Techniques: Whither we are?, Proc. Optics and Lasers in Engineering, 48(2): 133-140, 2010). The disadvantage, however, is that several images of the same spot of the surface are needed. During the inspection of films and other web product in the production process/basically of surfaces moving relative to the inspection device it is however impossible in practice to take several pictures of exactly the same spot of the surface, since the surface is continuously moving. For example, webs which run at high speed cannot be stopped during production. One could solve the problem by using an inspection device moving synchronously with the web. Admittedly such a solution is technically complicated and therefore expensive, and it requires a lot of space, which particularly in production environments is often not available.

EP 2 390 656 B1 has disclosed a method, in which a running web surface is monitored by preferably a line camera. Illumination consists of a quickly switchable pattern illumination (preferably LED illumination) mounted transversely to the web. This illumination consists of individually controllable LEDs or LED modules, with which it is possible to very quickly dynamically generate different illumination patterns. Switchover and image recording are synchronised, so that images of the surface with different illumination patterns can be recorded in quick succession. In particular scanning and switchover can be performed so quickly that the distance between image recordings in feed direction is very much smaller than the extension of a pixel in feed direction. Thus images can be recorded at almost the same spot. Recordings at exactly the same spot, however, cannot be realised therewith.

It is the objective of the invention to propose a robust option for the inspection of moving surfaces, which in particular can be realised in a simple manner even in an industrial environment such as in production processes.

According to the invention this objective is met by a method as set forth in the claims and an inspection device as set forth in the claims.

With the method described in the beginning provision is made for the illumination device and the image recording device to be arranged in the reflection angle (relative, respectively, to the surface normal vertically aligned on the surface in the reflection zone). "In the reflection angle" means that the edge rays of the image point (i.e. the visual rays emanating from the edge of the image point) are reflected in the reflection points on the surface and mark the visible area of the illumination pattern (pattern area) in the image point. In other words the reflection of the illumination pattern of the pattern on the surface is mapped exactly in the image points of the image recording device. A camera (as recording device) thus looks exactly onto the pattern (i.e. the illumination device, which may for example be designed as the illumination line).

With a moving object the reflection angle does not change, as long as the shape of the surface and its arrangement relative to a stationary inspection device does not change. This is true for a planar surface or a slightly curved surface, if the curvature is constant on average and the direction of the surface normal of the surface (at least relative to the direction of the visual rays) changes only negligibly. This may for example be the case with a wavy surface structure, where the change in direction of the surface normal is small. Small means that the change is only so big that the pattern area remains visible in the image point. The pattern area must therefore be correspondingly wide in feed direction. As soon as this is no longer possible, the method according to the invention cannot be applied with a stationary inspection device. In this case, however, the inspection device according to the inventive method proposed can be moved in reflection arrangement respectively, across the curved surface.

Insofar as due to the known periodicity of the change in direction of the surface normal mechanical tracking of the inspection device is possible such that the reflection conditions are adhered to or the reflection angle lies within the recording area due to using a planar illumination device and recording device, and the image points are selected in accordance with the periodically occurring reflection angle, the method can also be used for curved surfaces.

Independently therefrom the method can be used to determine the topology of imperfections, as long as the changes in the pattern can be definitely detected by the inspection device.

In order to be able to inspect larger surface areas or to allow continuous inspection during production for example, provision is made according to the invention for moving the object and thus the surface of the object during inspection of the surface relative to the inspection device, preferably in a defined/closely controlled direction of movement.

For the phase shift methods described in the beginning it is really necessary that the images belonging to an image sequence always record the same spot of the surface. Since here a moving surface, such as a material web moving relative to the recording device is inspected, this is not possible. Nevertheless, in order to be able to use the method and detect the phase of the pattern, the duration of the image recording sequence is chosen to be short enough for a sequence reflection zone to be regarded as constant. The sequence reflection zone is defined as the total surface area covered by the reflection zones/recorded in the respective images from the image recording sequence. Expressed in a simplified manner the images of an image recording sequence are recorded one after the other at such speed that the travel from the first to the last image of this image recording sequence is so small that the captured surface area (reflection zone) can still be regarded as practically the same spot of the surface.

The surface area covered in total by the reflection zones in the respective images from the image recording sequence results from combining all reflection zones of all individual images, which were recorded during the image recording sequence, in a common area, which is then called the sequence reflection zone. This surface area can then be regarded as at least approximately constant, if the reflection zones of all images from the image recording overlap by at least 40% or more, preferably by at least 60%. These values are, however, not to be understood as fixed values but as typical guideline values, which the expert can adapt, possibly experimentally, to the respective conditions. In principle the methods work well as long as due to the optical conditions distinctly less than one period length of the pattern is mapped onto one image point. Concave curvatures of the surface, which due to a concave mirror effect map large pattern areas onto an image point, are particularly critical. For a fault detection an area of 40% to 70% overlap should be sufficient, with an estimate of the surface normal (i.e. an estimate of the topology of the surface) an area of 60% to 80% overlap. Depending on the shape of the surface and the type of occurring defects other areas may also result, which the expert, when setting up a respective inspection device, may determine and/or predefine based on the teaching of the invention, possibly empirically with the aid of test measurements. In other words, it is proposed according to the invention to choose the duration of the image recording sequence in such a way, as to record the images recorded within the image recording sequence in chronological order so quickly one after the other, that the shift path of the surface due to the movement of the object from the first image to the last image of the image recording sequence is so small that the reflection zones of the first image and the last image can be regarded as one and the same area on the surface. Compared to a measurement taken at standstill of the object a measuring error results, which decreases in size the better the above condition is met.

The reflection zone on the surface, which is captured in the image point (in minimum resolution defined by a camera pixel or possibly by a combination of several camera pixels), is predefined by the recording geometry (distance, recording angle) and the recording optics. Due to the arrangement of recording device and illumination device in the reflection angle relative to the surface normal a change in the angle of one of the two devices must be reproduced also for the other device, respectively. This makes changes of the reflection angle comparatively expensive. The same applies, respectively, to changes in the recording optics. The size of the reflection zone and/or of the pattern area mapped in the reflection zone can, according to the invention, be varied or adjusted in a comparatively simple manner via the distance of recording device and/or illumination device. Admittedly this also requires a change in the construction of the inspection device.

According to the invention it is easier to influence other parameters when performing the method proposed by the invention. Suitable parameters when performing the method will now be described. In order to adapt the duration of the image recording sequence in dependence of a predetermined speed and direction of movement of the object in such a way that the sequence reflection zone can be regarded as constant, it is possible according to a preferred embodiment of the invention to undertake one or cumulatively more of the measures listed hereunder.

As such, when performing the method according to an embodiment of the invention, provision may be made for the size of the image point to be set. In the simplest case the size of the image point may correspond to the pixel resolution of the camera (used as image recording device). This represents—for a given distance of the camera and predetermined focal length of the camera—the highest possible resolution. The higher the resolution of the camera, the smaller is the reflection zone associated with an image point on the surface and the smaller are the defects detectable on the surface. One option for changing the size of the image point consists in altering the pixel resolution of the camera. The pixel resolution of the camera—for the digital image recording preferred according to the invention—is predetermined by the photo chip used as recording sensor of the camera, on which during the exposure time individual pixels (sensor pixels) capture (integrate) the light incident on this pixel. By reducing the resolution the size of the image point can be achieved also by combining several sensor pixels of the camera to form one image point. Also one image point can be called a pixel. But image pixel and sensor pixel are different, if several sensor pixels are combined to form one image pixel.

According to one embodiment setting the size of an image point can be done by combining several pixels of a recording sensor (sensor pixel) of the recording device to form one image pixel. In one variant the number of combined pixels in direction of movement of the object and transversely to the movement direction of the object can be selected in various ways according to the invention. It may be expedient, by accepting a lower resolution, to increase the size of the reflection zone in movement direction of the object, in order to achieve a higher coverage of the reflection zones of the individual images in one image recording sequence respectively. As a result the sequence reflection zone in movement direction of the object is enlarged. Transversely thereto a higher resolution may be maintained. The resolution transversely to the movement direction of the object and its surface is determined solely by the recording geometry, i.e. in essence by the size of the image points (limited by the pixel size of the recording sensor of the image recording device as regards the smallest possible extension), the focal length of the lens and the viewing distance. The resolution transversely to the movement direction is not influenced by the movement.

Movement blur develops in longitudinal direction of the movement. Due to the fact that the camera during image recording integrates all the light in one image point (pixel of the image, which does not necessarily coincide with a pixel of the recording sensor), which is incident on this image point during an exposure, the monitored surface which is mapped on the one image point enlarges in movement direction. In relation to the moving surface (also called reflection zone associated with the image point) the image point appears to be stretched in length, so to speak. "Longitudinal" and "transversely" refer here to the movement direction and do not necessarily have to coincide with the line and column directions of the cameras. For an oblique viewing angle each pixel appears to be obliquely stretched in a corresponding manner in relation to the line and column direction of the camera.

In a succession of images (during an image recording sequence), which is recorded for a multi-image phase shift method, the same spot on the surface should really be mapped in each image point (image pixel) in all images. When recording a number of images one after the other, these are, however, in relation to a moving surface, shifted against each other. Therefore in order to compensate for this, measures are taken according to the invention which may result in the reflection zone of the different images being monitored as approximately the same spot on the surface. The change in size of the image point may contribute to this in the above-described manner.

According to the invention a further measure may consist in setting the duration of the image recording sequence during performance of the method. The duration of the image recording sequence, i.e. in other words, the time which is needed to record all images of the one image recording sequence, determines—for a predetermined movement speed of the object/the surface—how far the surface area corresponding to the reflection zone of the first image shifts up to the recording of the last image. From this results the size of the sequence reflection zone and the overlap to be set according to the invention, of the reflection zones of the induvial images. Basically, it is true to say that the larger the overlap, the shorter is the duration of the image recording sequence.

Apart from the limits of the maximum scanning frequency of the recording sensor and the shortest possible exposure time of the recording device, the scanning frequency (defined as the frequency of successive image recordings) and/or the exposure time can be adapted. The shorter the exposure time, the sharper is the recorded image (reduction of movement blur) and the faster images can be successively recorded (scanning rate). A shortening of the exposure time can be achieved in that the brightness of the pattern generated on the surface is increased and/or the aperture of the recording optics is opened. By increasing the brightness/enlarging the aperture opening (usually defined by smaller aperture numbers in the optics) the exposure time can be shortened. It therefore makes sense to use an illumination device with high but dimmable light intensity.

Suitable illumination devices may be constructed from individually dimmable LEDs, which individually dimmed allow the generation of a pattern and dimmed together allow the adjustment of the total light intensity. Basically it may be preferable to operate the illumination device with maximum light intensity and to reduce the exposure time up to the point until suitably exposed images are recorded.

According to the invention therefore, when adjusting the duration of the image recording sequence at least one of the variables listed hereunder can be adapted: exposure time of an image, brightness of the pattern generated on the surface, scanning frequency of the recording sensor and/or number of images per image recording sequence. It is also possible to adapt all or a number of several of the variables.

As such the duration of the image recording sequence can of course also be changed according to the invention by changing the number of images per image recording sequence, wherein shortening the image recording sequence can be achieved by reducing the number of images, and vice versa.

Furthermore, according to the invention the measuring sensitivity can be influenced through choosing the illumination distance (simultaneously also the viewing distance between recording device and pattern) and the viewing angle. Larger distances just as flatter viewing angles (i.e. flatter in relation to the surface; vertically to the surface would be max. steep) lead to higher sensitivity. In particular with partially reflecting surfaces in both a mirroring and a diffuse manner it may be especially preferable to choose a flatter viewing and illumination angle between (e.g. <30°) and/or a maximum illumination distance. According to the invention a maximum illumination distance may mean that an available space is utilised for the arrangement of the illumination device. The illumination distance (distance between the illumination device and the surface) may e.g. be chosen to be larger than the distance between recording device and surface, wherein typical values may lie in the range between 1-fold and e.g. 10-fold. The expert would choose the values possibly experimentally adapted to the respective case of application, wherein according to the basic teaching of the invention sensitivity would be increased in many cases through smaller illumination angles and viewing angles and/or a larger illumination distance (between recording device and illumination device).

The aim of recording a number of images is to determine the phase of the pattern, in order to identify therefrom the position of the known illumination pattern in a recorded image point. This will allow defects in the surface to be detected from distortions of the pattern on the surface. According to one embodiment three images may for example be recorded. It is for example possible to periodically shape the generated pattern asymmetrically such that the phase of the pattern can be unequivocally determined from three images. Alternatively the pattern may also be periodically shaped symmetrically with the images being recorded asymmetrically, for example by varying the scanning/image recording frequency between different images within the same image recording sequence.

One application preferred according to the invention however, provides for scanning with at least or exactly four images within the same image recording sequence. The pattern itself may for example be a sinusoidal distribution of brightness, which is recorded in an identical scanning sequence in four different phase positions. From this the phase of the pattern in each of the images can be accurately determined in a simple manner. For example, the phase shift between the phase positions in the image recording sequence of successive images may be just ¼ of the period length of the pattern. But other phase shifts between the images of an image recording sequence are also possible.

According to a further aspect of the invention the illumination pattern may be generated by the illumination device in such a way that the visible area of the illumination pattern recorded in the image points of the images recorded during respectively one image recording sequence can be regarded as constant.

The area of the illumination pattern (pattern area) visible in the image points during an image recording sequence may be regarded as constant so long as this pattern area remains at all still visible in the image point and the recorded intensity of the pattern area does not change significantly. This may for example be assumed if the recorded intensity during an image recording sequence does not change by more than 10%, preferably by not more than 8%, and particularly preferably by not more than 4%, or another defined criterion is maintained. Basically the criteria already discussed above apply here too.

To this effect, according to a preferred aspect of the invention, the period length of the pattern in the illumination pattern may be chosen such that depending on a topology of the surface in direction of the pattern course an intensity change may be regarded as sufficiently constant, in other words this means that the intensity change does not exceed a criterion appropriate to the respective circumstances. The selection of the criterion may be determined by the expert possibly experimentally, when the system and certain patterns are set up.

The topology of the surface is determined in particular by its curvature, which entails a change in the direction of the surface normal. The direction of the surface normal is correlated with the reflection angle. By way of the topology of surfaces which are to be examined with the method according to the invention, it is therefore possible, to determine via the resulting reflection angle for a known arrangement of the inspection device, which pattern area of an illumination pattern is mapped in the image point during a defined duration of the image recording sequence. By predefining the period length the illumination pattern can thus be specified in such a way that the above-mentioned criteria are maintained. The method can therefore be used flexibly for defined inspection tasks.

According to a further aspect of the method proposed according to the invention it may be provided that the periodic pattern is generated along the movement direction of the object, transversely to the movement direction of the object or alternately along and transversely to the movement direction of the object.

With a pattern along the movement direction of the object the already discussed movement blur and the shift of the reflection zone, for a curved surface to be inspected, will overlap with a shift of the pattern area viewed through the image point due to the change in the reflection angle and, connected therewith, with an intensity change, because the intensity of the pattern changes in this direction.

For a pattern transversely to the movement direction the reflection zone also changes. But since the pattern along the shifting direction of the object comprises the same intensity, a change in the reflection angle does not necessarily lead to a change in intensity. The intensity measured in the image point remains the same as long as the image point captures the same pattern area and the curvature of the surface does not lead to a shift of the pattern area captured in the image point transversely to the movement direction.

According to the invention this difference can be taken into account during the above described adaptation of the period length of the patterns in dependence of the alignment of the pattern along or transversely to the movement direction of the object. The period length of the pattern in particular for patterns along and transversely to the movement direction may according to the invention especially preferably be different.

In addition a known curvature of the surface of an object in a defined surface area to be inspected can also be used according to the invention for specifying suitable criteria in order to differentiate between a non-defective surface and a defective surface and/or to correct the deviation resulting from the known (expected) surface shape in the evaluation of the recorded images as part of the detection of defects.

Due to generating patterns alternately along and transversely to the movement direction different defects, in particular directional defects in the surface, can be captured systematically in a more reliable manner, In one embodiment of the method proposed according to the invention the recording device can be focused such that the illumination pattern recorded in the image is blurred.

This may be achieved, for example, in that the recording device is not focused on the pattern but on the surface or another defined point. By predefining certain aperture and focus settings, the depth of focus/depth of field may also be chosen selectively according to the invention in order to map the illumination pattern in the image so that it is blurred, but the surface is in focus. This has the effect of making a sharp brightness distribution look washed out. Thus for example a sharp pattern simply consisting of alternating separable light/dark areas may be mapped as an approximately sinusoidal brightness curve. In this case a particularly simple illumination device may be used, without the need for additional optical elements to generate the desired brightness curve. Besides the brightness distribution becomes less sharp, which in particular may have a positive effect on curved surfaces and effects connected thereto, when shifted pattern areas are mapped on the images recorded in an image recording sequence.

In many cases the surface to be inspected is not ideally mirroring, but reflects semi-diffusely. The reflection is albeit directed, but scatters in a relatively large spatial angle, which means the Bidirectional Reflectance Distribution Function BRDF has a scatter club of medium width. This too leads to quite a helpful wash-out of the brightness distribution of the pattern in the images, as long as the scatter club remains so narrow as to result in a sufficient modulation of the mirrored pattern in the camera image and it is possible to work on the basis of a reflecting, although not ideally mirroring surface. Such a property of the surface may also be utilised to achieve an effect similar to that achieved through the described out-of-focus-setting of the camera on the pattern. Such an (additional) effect must however be taken into account during the out-of-focus-setting, because part of the blur (desired in this case) is in any case generated by the surface itself.

On the other hand the surface must mirror sufficiently to still allow a pattern to be observed at all. For surfaces with relatively little mirroring it is therefore advantageous to select a viewing and illumination angle, which is as flat as possible, and to enlarge the illumination distance.

It can be particularly advantageous, if during inspection of the surface performed according to the invention by means of deflectometric processes the three-dimensional topography of the surface of the object is determined. If, as with the method proposed according to the invention, the recording geometry and the pattern geometry are known, a 3D-topography of the surface can also be determined. A number of options are known as to how this can be performed. In deflectometry a deviation of a light ray incident on the surface is determined, in that the point of the pattern is determined, on which a visual ray is incident, which is emitted by the camera (recording device) and mirrored (reflected) at the surface. Therefore the deflection of the visual ray is determined, which is dependent on the surface normal in the respective spot. From the thus created normal field of the surface the topography of the surface can be determined, for example by integration.

A particularly preferred use of the above described method or of parts thereof and/or of the inspection device described hereunder results from an inspection of web product during, for example, a production process or after its manufacture or of, in particular treated, curved or planar surfaces.

Figure 2:
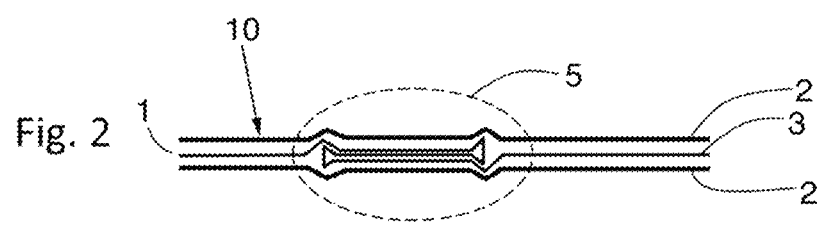

An important concrete typical example is the inspection of an FCCL film, during or after production. FCCL-films (Flexible Copper Clad Laminate) are the core material for the manufacture of flexible printed circuit boards. FCCL-films usually comprise a thickness of approx. 100-150·µm and comprise e.g. a polyamide core (generally a plastic film), which is laminated on one or both surface sides with copper film. During lamination folds may be created, which are to be detected by the method proposed according to the invention. During surface inspection it might also be desirable to detect laminating defects, in particular so-called laminating folds 4 (as schematically depicted in FIG. 1) or inner folds 5 (as schematically depicted in FIG. 2). With laminating folds, the material has formed slight folds, which were pressed flat again during the laminating process. Inner folds develop from folds in the inner plastic film, which were laminated in.

Both defects are very hard to detect with the human eye, because the films are very thin and the surface is therefore not much impacted by the folds. The defects are only detected, when observing the direct reflection of the light on the surface of the films. This is aggregated by the fact that the copper film reflects semi-diffusely. With other laminated films appearance is important, which is adversely affected by such defects despite the small topographical characteristic.

With the inspection of curved surfaces such as e.g. painted containers or car bodies, the inspection device is programmed according to a preferred embodiment by means of e.g. a respective handling unit and guided across the curved surface such that both the illumination device and the recording device are held in the reflection angle to the surface. In this case the inspection device is thus moved relative to the mostly stationary object. This generates a relative movement of the object/object surface to the inspection device. Again in this description this type of relative movement is referred to, when there is talk of a moving object relative to the inspection device. The most important thing is to find smallest flat topographical defects on surfaces curved in this way, which could adversely affect the appearance or the function of the surface, as often as possible. Frequently it is helpful to measure such defects also in a three-dimensional manner, i.e. to determine the 3D-topology of the surface and of the defect.

The invention further relates to an inspection device for the optical inspection of a surface of an object as well as its use for the above described applications. The inspection device is provided with an illumination device and a recording device, which are aligned to each other such that a visual ray emanating from the recording device is incident on the illumination device as a visual ray reflected at the surface then, when a surface normal standing vertically on the surface in the incident spot of the visual ray just halves the angle between the outgoing visual ray and the reflected visual ray. In other words therefore, the recording device and the illumination device of the inspection device are arranged in the reflection angle relative to the surface. The illumination device is designed to generate a temporally periodic pattern with different illumination patterns during an image recording sequence, and the recording device is designed to record images of the patterns reflected on the surface synchronously with the generation of the illumination patterns during the image recording sequence. The inspection device further includes a computing unit for controlling the inspection device and for evaluating the recorded image, wherein a processor of the computing unit is designed for performing the above mentioned method or parts thereof.

According to a preferred embodiment of the inspection device proposed according to the invention the illumination device includes individually controllable light elements arranged in rows or as a matrix. Further preferably the recording device may include a recording sensor for recording images mapped on the recording sensor via a recording optics, wherein the recording sensor includes individual sensor pixels (camera pixels) arranged in rows or as a matrix.

The illumination device may for example be designed as an illumination line, which is preferably arranged transversely to or along the feed direction (movement direction of the object/of the surface relative to the inspection device). An illumination line consisting of individually controllable illumination elements arranged in a line may consist of many LEDs arranged side by side or of LED modules, which can be individually switched synchronously with the image recording. The illumination device is used to generate in quick succession the periodic patterns necessary for the phase shift process. The recording device may also be designed as a line camera for example, which may also be assembled, as required, from several line camera modules arranged side by side. In such an arrangement the composed image field of the line camera is a line on the surface (the so-called scan line). This scan line may be aligned transversely to the relative movement direction of the surface and has, also in movement direction, a certain very small width compared to its length (extending transversely thereto), which depends on the pixel resolution of the line camera.

The illumination line may be so long (transversely to the movement direction) as to cover the entire width of the web to be inspected (or of the desired inspection area on the surface) in the reflection angle. When camera and illumination are arranged at the same distance from the surface, the illumination line on each side must be longer by about half the scan line width of an individual line camera than the scan line on the surface observed by all cameras, for other distances this must be longer or shorter, as appropriate.

The width of the illumination line (in movement direction) may determine the maximum surface angle, which is still capable of being measured with the arrangement. If the surface angle becomes larger than the maximum surface angle, the visual ray of the camera reflected by the surface is no longer incident onto the illumination and the camera does not see anything.

The method is also suitable for use with an area scan camera (matrix arrangement). The scan line then becomes the image field because the width in movement direction becomes substantially greater. The width of the illumination line can also be enlarged correspondingly in movement direction. In one variant an illumination matrix may be used instead of an illumination line. This consists of many individual LEDs or LED-modules, which are arranged in several seamlessly joined illumination lines, which are all switchable independently of each other synchronously with the image recording. The width of an illumination line may thus also be varied in a simple manner, in that several illumination lines are switched in the same way.

An illumination matrix cannot only be used for switching patterns transversely to the web direction, but also those along the web direction. The reason why this is of advantage is because deflectometry processes primarily measure surface angles/surface normals, namely in direction of the periodic pattern. Thus when using an illumination line, only angles transversely to the movement direction can be measured, whilst using an illumination matrix all directions can be measured, preferably the two directions along and transversely to the movement direction.

Figure 3A:
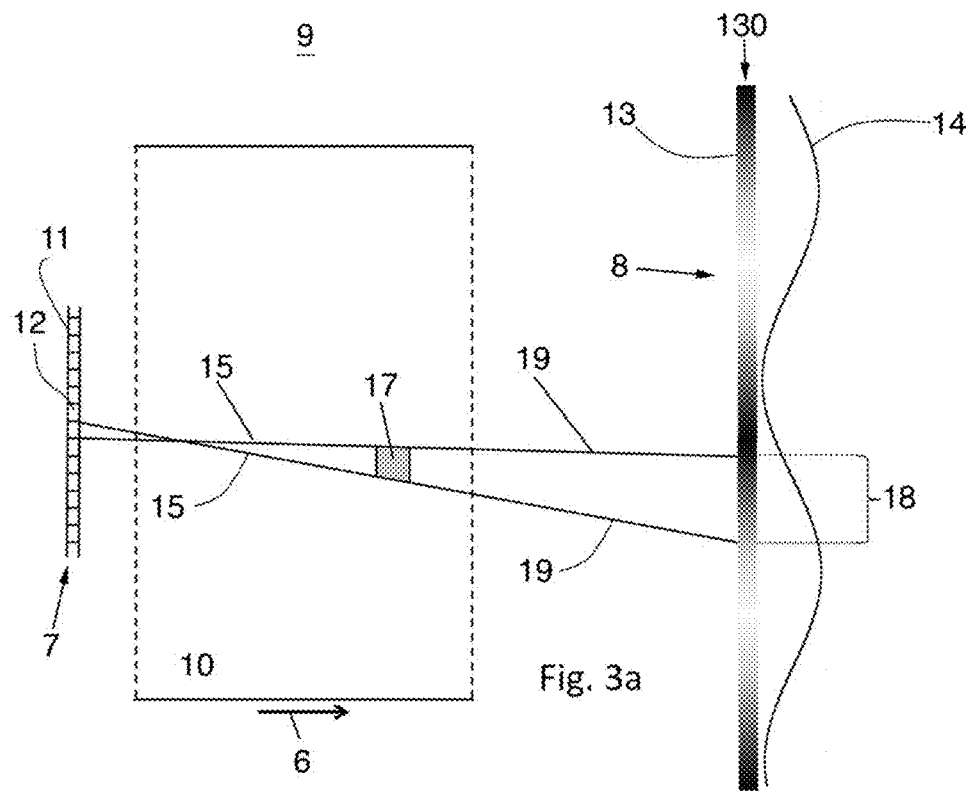
Figure 3B:
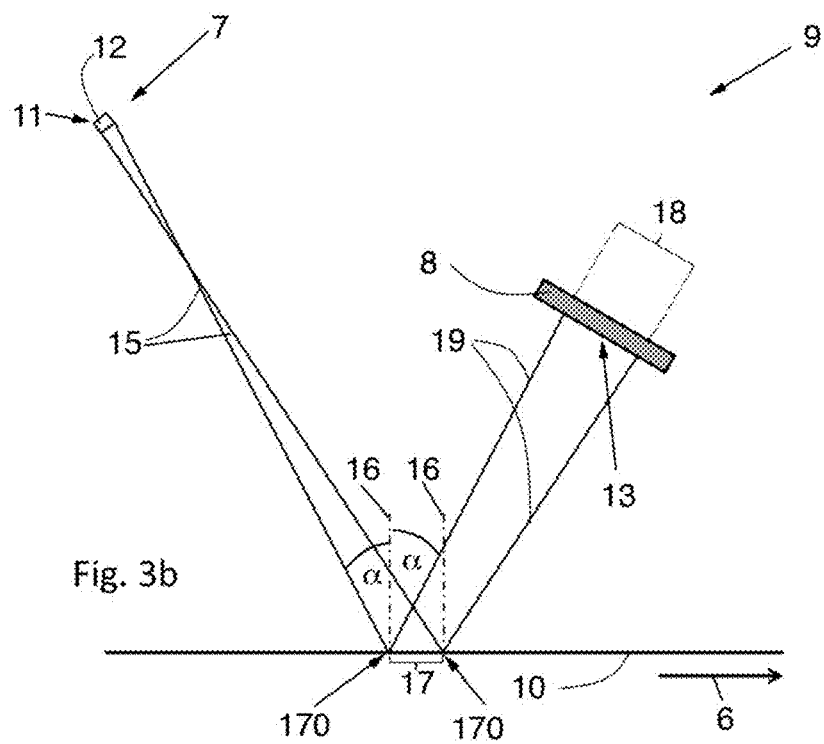

In the drawing:

FIG. 1, in a schematic sectional view, shows an object with a surface to be inspected with a first typical defect;

FIG. 2, in a schematic sectional view, shows the object according to FIG. 1 with the surface to be inspected with a second typical defect;

FIG. 3*a*, shows a top view onto an inspection device according to an embodiment of the invention for the inspection of a planar surface;

FIG. 3*b*, shows a side view of the inspection device according to FIG. 3*a*;

The object 1 depicted in FIGS. 1 and 2, the surface 10 of which is to be inspected by the inspection device according to the invention, is an FCCL film, which is used as raw material for printed circuit boards. It is a laminated film 1, which consists of three layers, a middle plastic film 3 as the middle layer, onto which the outer copper films 2 are laminated. The surface 10 of the object 1 is typically examined for surface defects.

This surface inspection is also to be used for detecting laminating defects, in particular so-called laminating folds 4 (FIG. 1) and inner folds 5 (FIG. 2). With laminating folds 4 the material has formed slight folds, which were pressed flat again during the laminating process. Inner folds 5 are created in that folds have formed in the inner plastic film 3, which were laminated in.

FIG. 3*b* shows a side view of the inspection device 9 with an illumination device 8 and a recording device 7. On the illumination device 8 a temporally periodic pattern 13 with different illumination patterns 130 is depicted, which illuminates the surface 10 of the object 1 (see also top view as per FIG. 3*a*). The illumination pattern 130 comprises a brightness distribution 14. This also causes the pattern 13 to be generated on the surface 10. The recording device 7 records the pattern 13 on the surface 10 in an image.

The recording device 7 also includes a recording sensor 11, which generates an image with many image points 12. Due to an optics of the recording device not depicted visual rays 15 emanating from the (each) image point 12 are reflected at the surface 10 and are incident as reflected visual rays 19 on the illumination device 8 on the pattern 13 generated there. The edge rays of these visual rays 15, 19 are plotted in FIG. 3*b*. The edge rays emanate from the edges of the image point 12 and delimit the reflection zone 17 on the surface 10. All visual rays 15 emanating from the image point 12 in the reflection angle α and incident on the surface lie in the reflection zone 17 on the surface 10 and are also reflected in the reflection angle α from the surface as reflected visual rays 19. They are incident on the illumination device 8 in the pattern area 17, because according to the inventive arrangement the recording device 7 and the illumination device 8 are arranged in the reflection angle α relative to the surface 10.

The reflection angle α is defined as the angle between the incident visual rays 15, 19 (emanating from the image point 12)/the exiting (reflected from the surface 10) and the associated surface normal 16. The surface normal 16 belonging to a visual ray 15, 19 extends vertically to the surface in the reflection point 170, in which the visual rays 15, 19 are incident on the surface 10.

FIG. 3a concretely shows a line of the recording sensor 11 of the recording device 7, which extends along the width of the surface 10 such as a web product moving in movement direction as object 1, such as an FCCL film. The recording device 7 may be constructed as a line camera with only one sensor line of the recording sensors 11, or as an area scan camera with several such sensor lines. An image point 12 may be formed from one or several sensor pixels. Via the optics not depicted an image point 12 of the recording device (camera) captures the reflection zone 17 on the surface 10. The visual rays 15 are deflected on the surface 10 and capture the pattern area 18, which is given by the area of the pattern 13/the respective illumination pattern 130 of the pattern 13 at the point in time of the image recording. In the example depicted in FIGS. 3a and 3b the illumination device is designed as an illumination line, which is aligned transversely to the movement direction 6 of the surface 10.

FIG. 3b shows the same arrangement in a side view, in which the reflection of the visual rays 15, 19 (plotted as edge rays as in all figures) is clearly recognisable with the reflection angle α relative to the surface normal 16. The plotted edge rays of the visual rays 15, 19 visualise the size/area of the reflection zone 17 on the surface 10 and of the pattern area 18 in the pattern 13.

FIGS. 3a and 3b show the state during an image recording, wherein it is assumed that the movement of the surface 10 moving in movement direction can be neglected during the short exposure time of the image recording. If this is not the case, the images recorded show a certain movement blur, which can be counteracted by shortening the exposure time (providing illumination is sufficiently bright).

As already described a number of images are recorded in chronological order with the method according to the invention during an image recording sequence. Because the surface moves during the image recording sequence in movement direction 6, the image point 12 does no longer see the same surface area in the respective reflection zone 17 of the successively recorded images. Rather the reflection zones 17 on the surface 10 are shifted relative to each other in the successively recorded images.

Figure 4A:
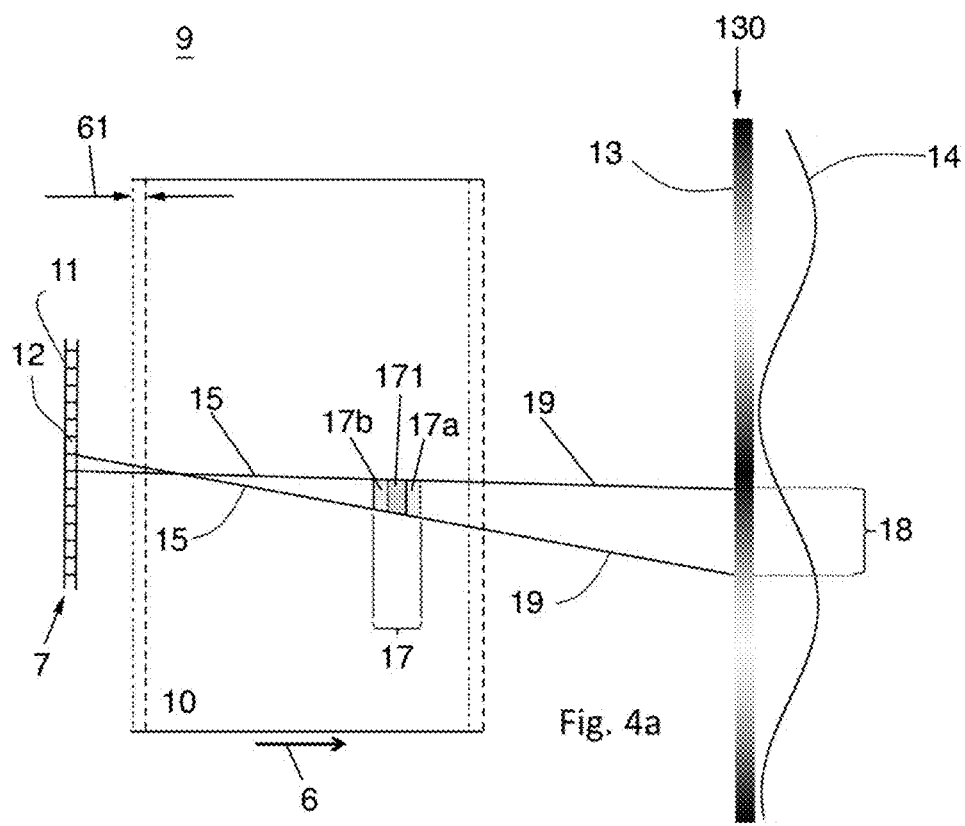
Figure 4B:
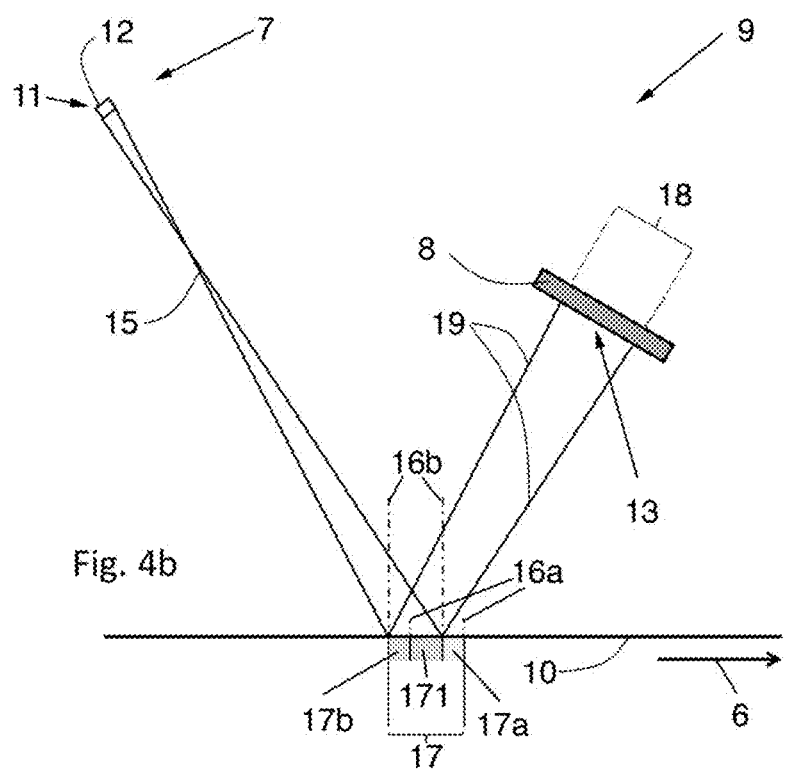

This is depicted in FIGS. 4a and 4b, in which the shift 61 of the surface 10 between the first and the last image recording in an image recording sequence is plotted. The reflection zone 17a is plotted as the reflection zone of the first image recording and the reflection zone 17b is plotted as the reflection zone of the last image recording from the image recording sequence, each shown as a hatching rotated by 90°. In the overlapping area the two hatchings are superimposed. The entire reflection zone 17 across all images of the recording sequence is correspondingly enlarged (relative to the surface 10 covered in total relative to reflection zones of individual recordings). The effect is basically similar also for the already discussed movement blur, the difference being that the entire reflection zone is integrated in one image. This makes the image look blurred, insofar as a movement blur is to be at all recognised.

Because the recording geometry does not change for a planar surface, the shift of the surface 10 does not have any effect on the pattern area 18; this remains unchanged during the recording sequence, wherein of course, as already described, the pattern illuminations are generated phase-shifted. This is, however, not shown in FIG. 4a for reasons of clarity.

FIG. 4b shows the same situation as FIG. 4a in a side view. The surface normals 16a during recording of the image a were at that time in the same position as the surface normals 16b during the recording of image b, which is shown here as a momentary recording of the arrangement. Because of the planar surface 10 the alignment of the surface normals 16a and 16b is the same, with the effect that the pattern area 18 does not change either.

FIGS. 3c and 4c show an arrangement of the inspection device 9, where the illumination device 8 comprises an illumination line aligned along the movement direction 6 of the surface 10. This can be achieved by a line illumination device (with correspondingly aligned line) or by a matrix illumination device, which is correspondingly controlled. Due to the planar surface a situation results also in this arrangement, which is comparable to that shown in FIGS. 3a, 3b and 4a, 4b. For a detailed description please refer to the above description.

Figure 3D:
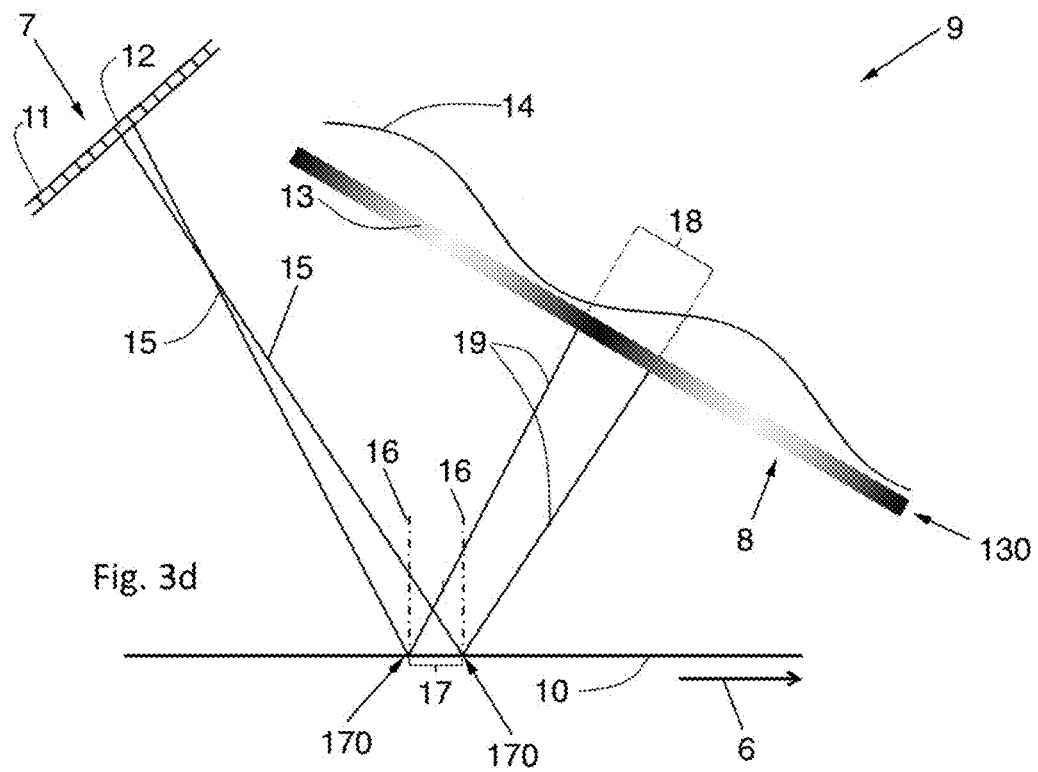
Figure 4D:
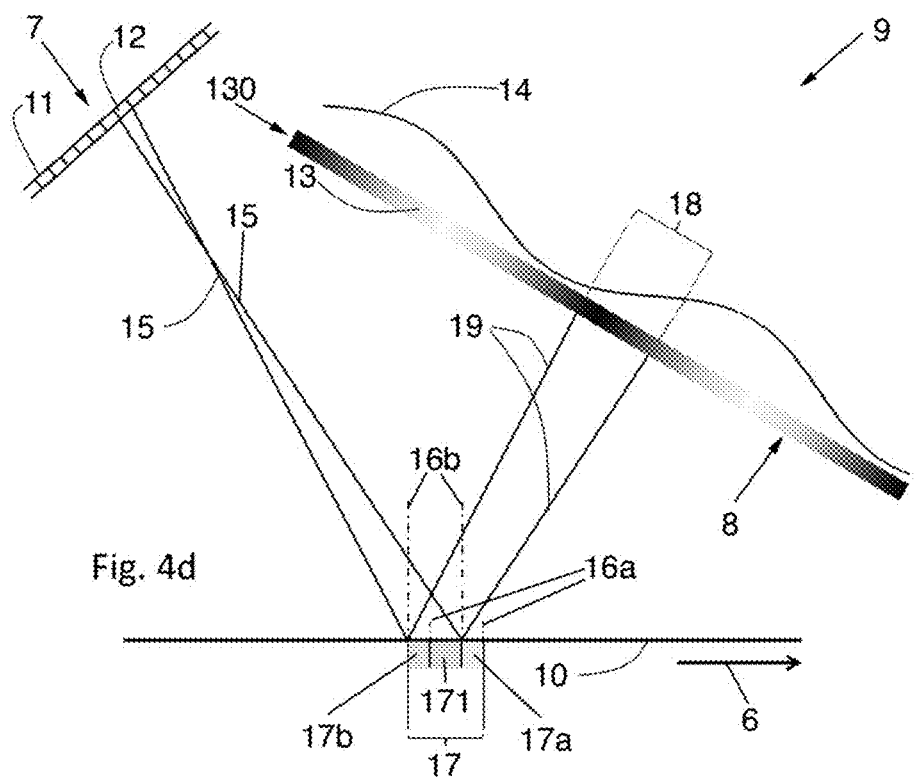

FIGS. 3d and 4d show an arrangement of the inspection device 9 similar to the arrangement in FIGS. 3c and 4c, where not only the illumination line of the illumination device 8, but also the sensor line of the recording sensor 11 are aligned along the movement direction 6 of the surface 10. The recording device may be designed accordingly as a line camera (with only one sensor line) or as a matrix camera (with several sensor lines arranged side by side). Due to the planar surface a situation arises also in this arrangement which is comparable to the arrangement shown in FIGS. 3a, 3b, 3c and 4a, 4b, 4c. For a detailed description please refer to the above description.

The picture is different, when the surface is indeed not planar. This is depicted in FIGS. 5a, 5b, 5c and 5d/6a, 6b, 6c and 6d. The views and arrangements correspond to the views and arrangements discussed with reference to the views and arrangements relating to FIGS. 3a, 3b, 3c and 3d/4a, 4b, 4c and 4d. In view of the general description therefore reference should be made to the above. Due to the curvature of the surface 10, which impacts the alignments of the surface normals 16, 16' and which influences the reflections of the visual rays 15, 19, different pattern areas 18a, 18b result as a consequence for the different images of an image recording sequence.

Figure 5A:
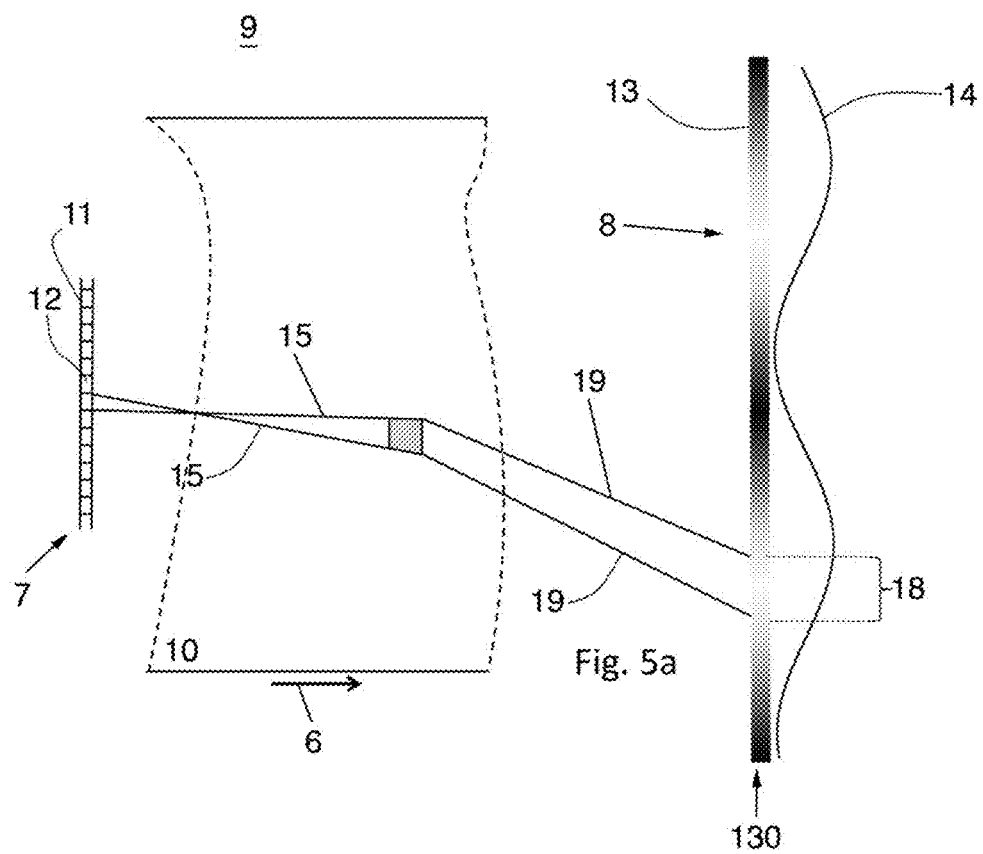
Figure 5B:
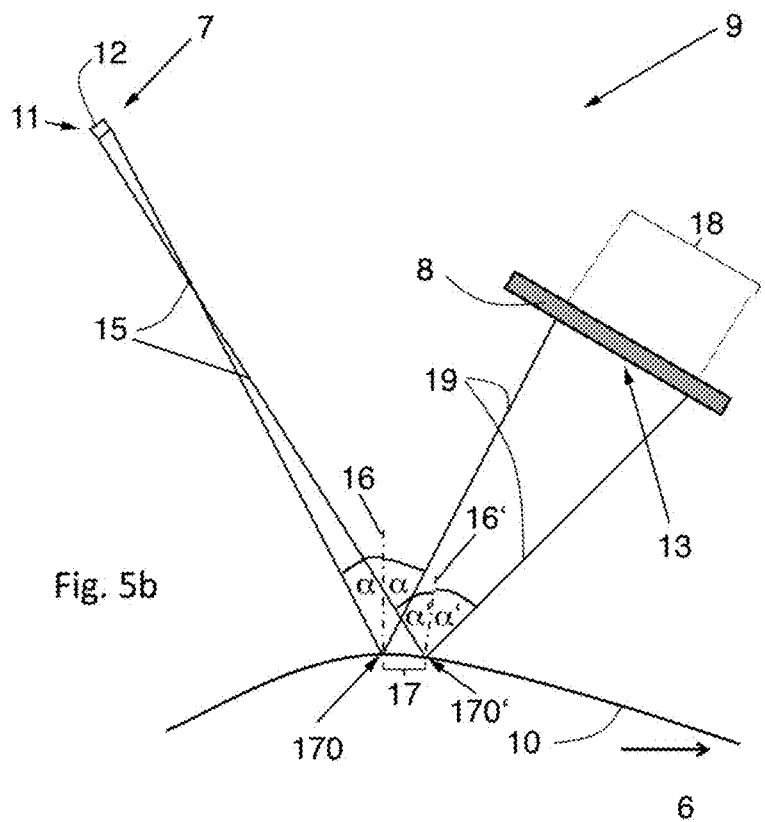

FIGS. 5a, 5b, 5c and 5d show the situation for one image respectively, for example the first image of the image sequences. FIG. 5a in essence corresponds to FIG. 3a, wherein the sides of the surface 10 depicted in a curved manner indicate the curvature of the surface 10 as extending transversely to the movement direction 6. Due to the curvature of the surface 10 the visual rays—in the top view— are then not reflected as a straight line, but deflected in the reflection point 170, 170'. Correspondingly the reflected visual rays 19 are incident on the pattern 13 in a pattern area 18, which lies in a different spot from that of the pattern area 18 according to FIG. 3a. FIG. 5b correspondingly shows that the surface normals 16 and 16' are differently aligned in the reflection points 170, 170' (and have therefore been marked with different reference symbols). The reflection angles α, α' are therefore also different.

Figure 6A:
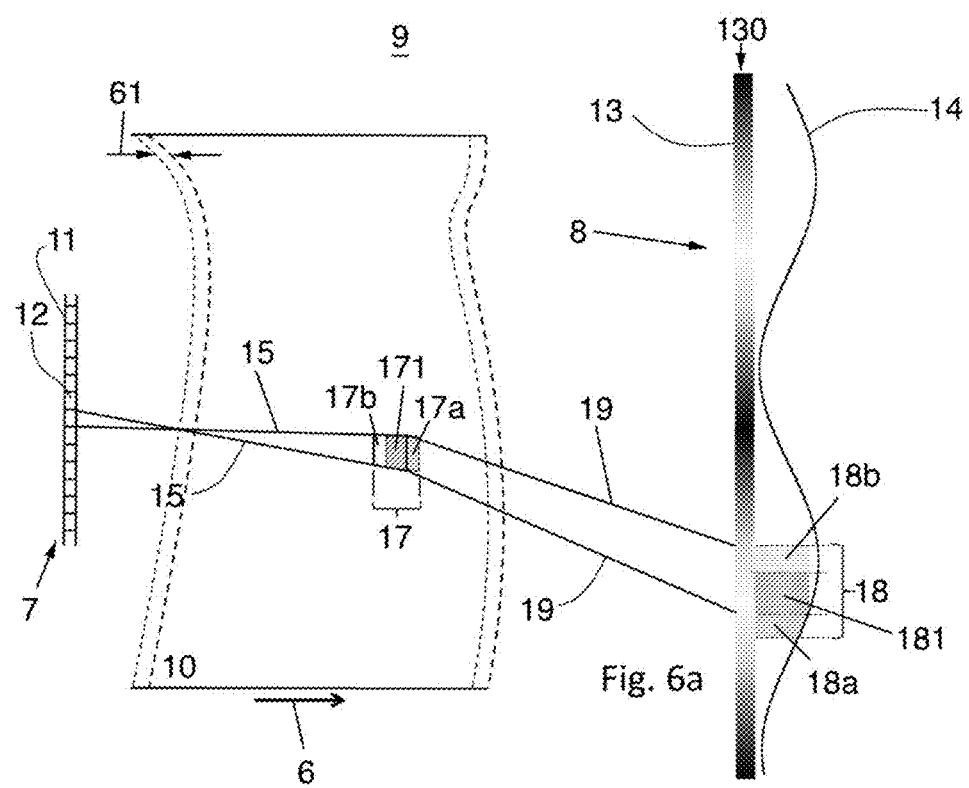
Figure 6B:
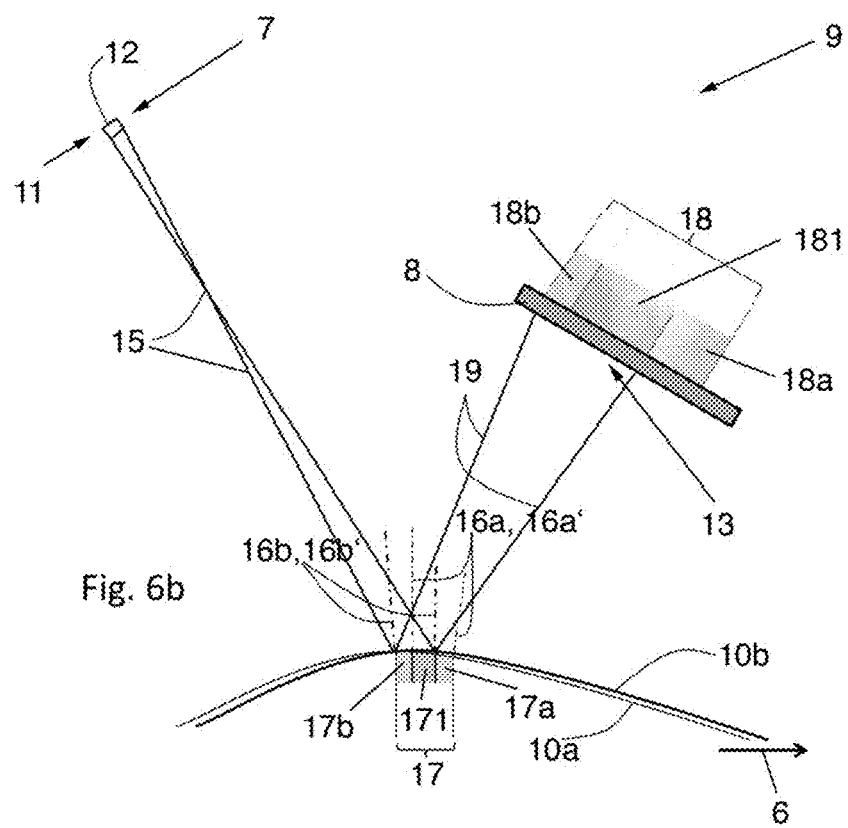
Figure 5C:
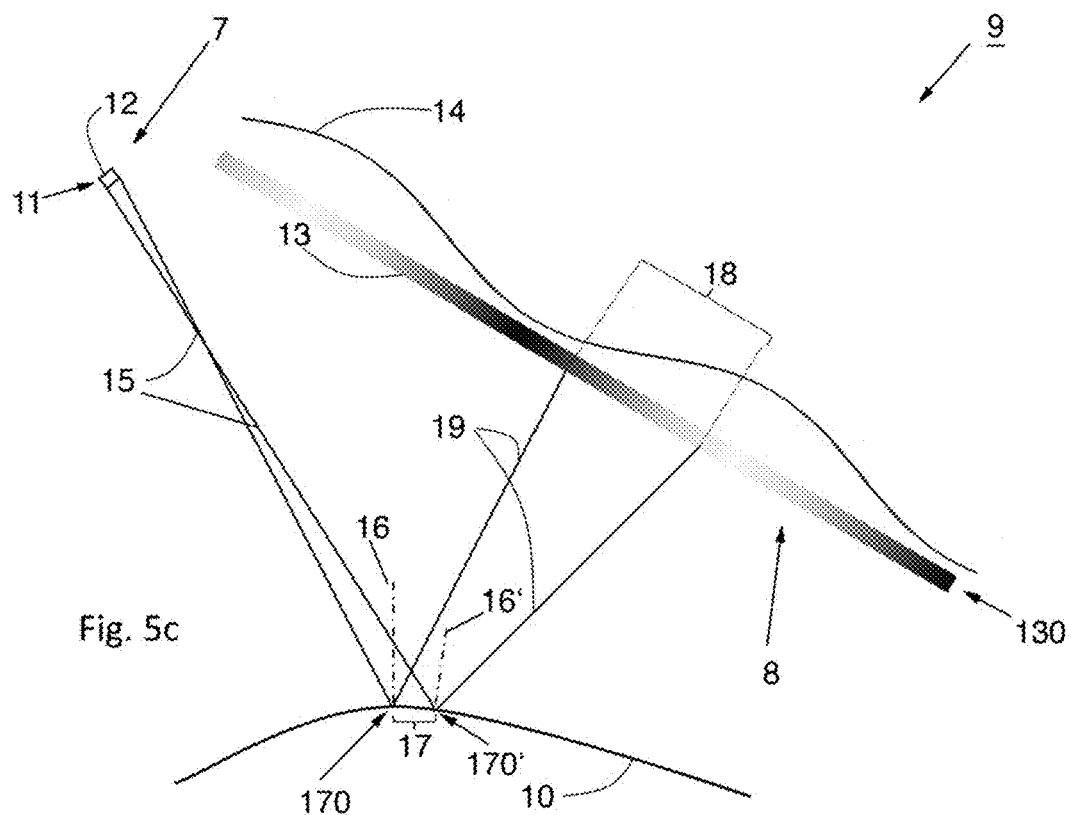
Figure 6C:
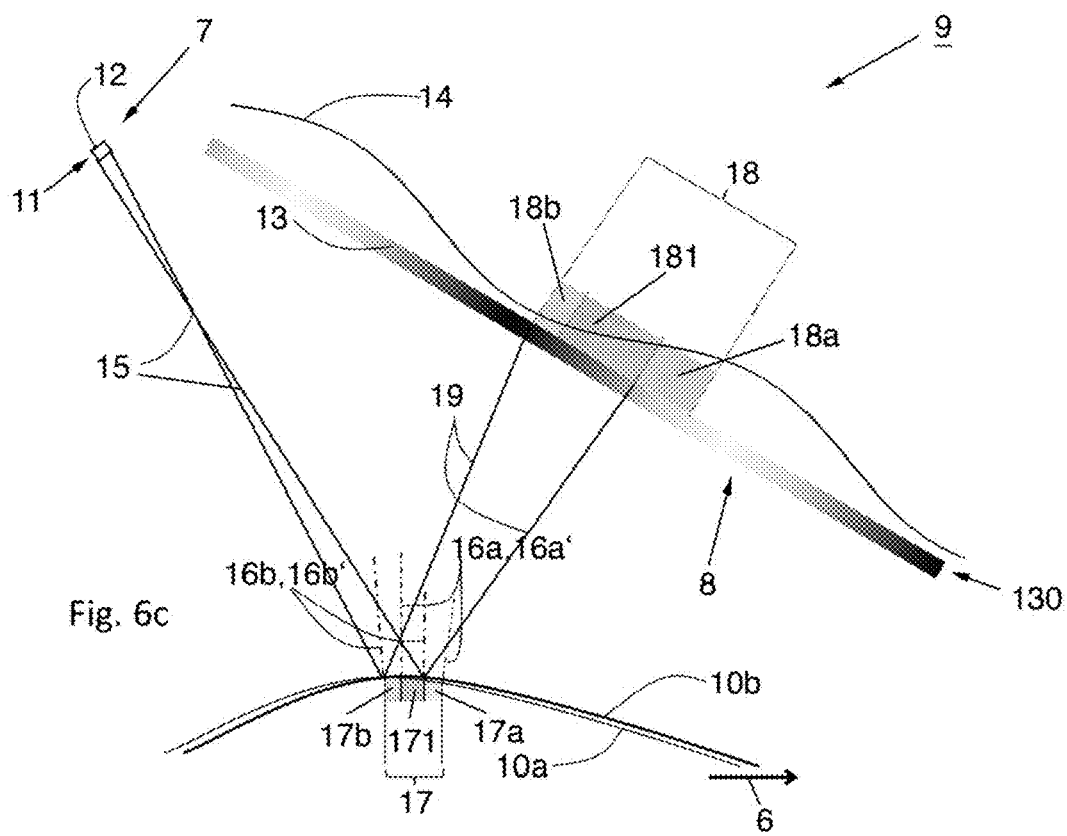
Figure 5D:
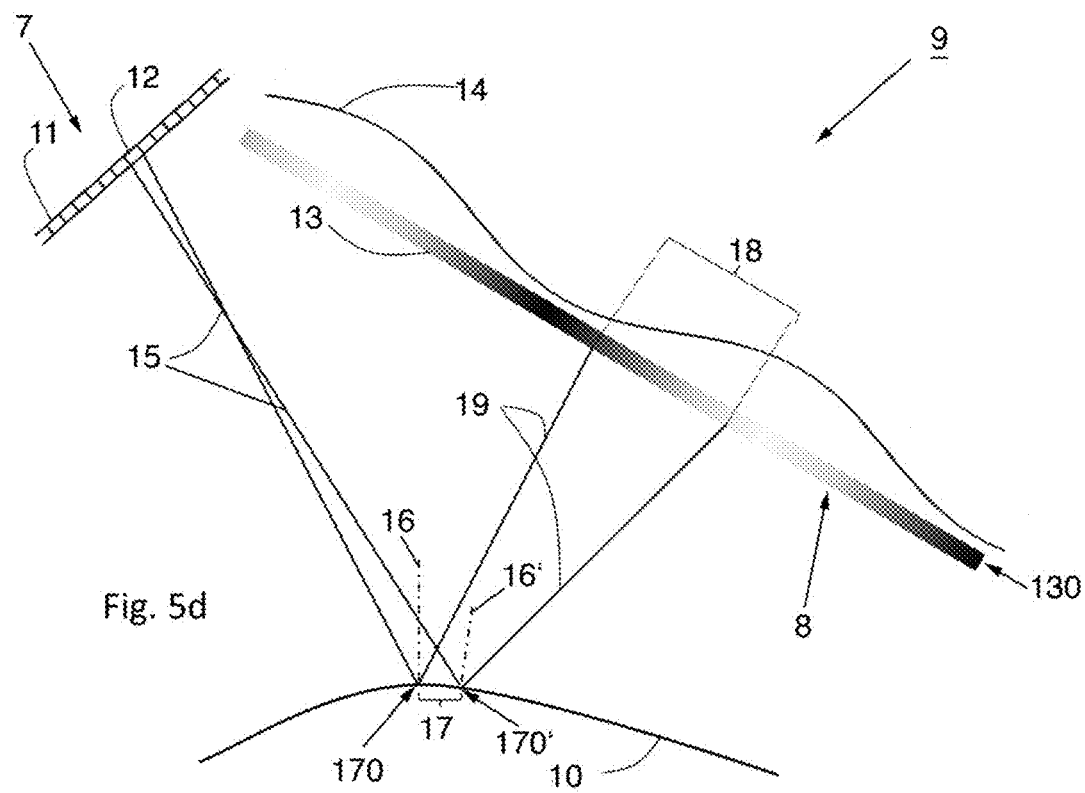
Figure 6D:
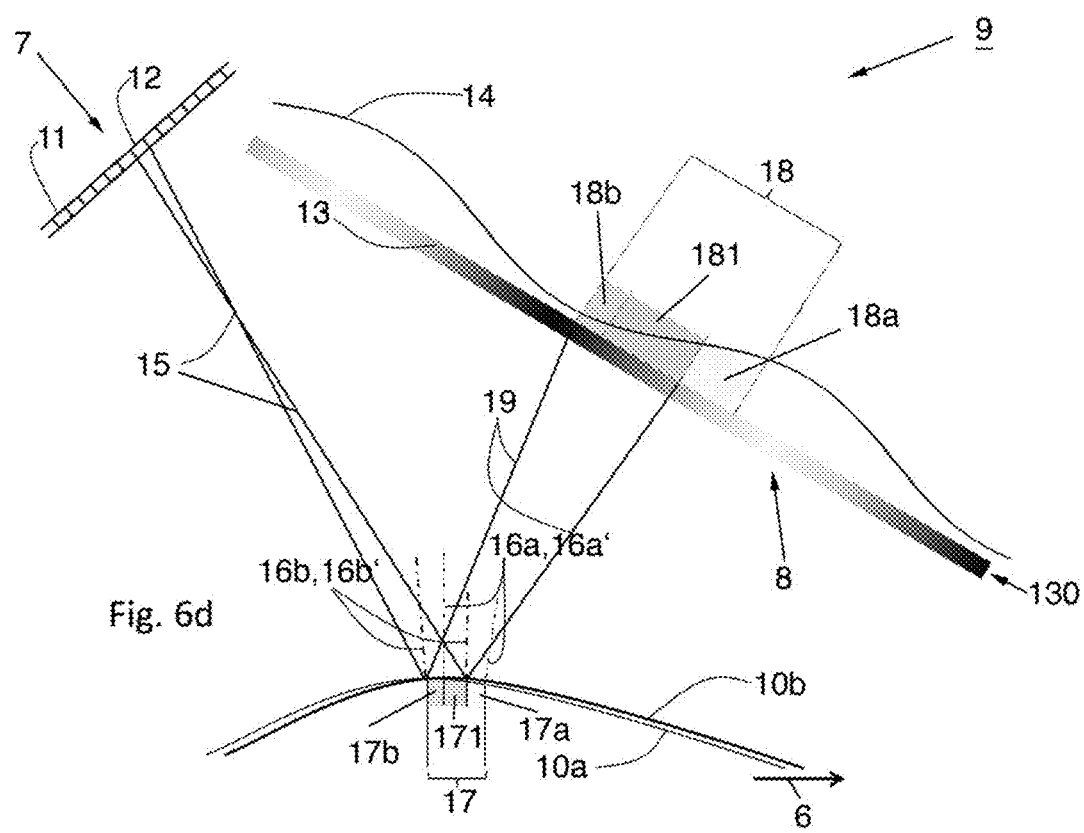

FIGS. 6a and 6b show the reflection zone 17a (for the visual rays 15, 19 reproduced in FIGS. 5a, 5b during recording) and the reflection zone 17b (for the visual rays 15, 19 reproduced in FIGS. 6a, 6b) together with the overlapping area 171. The pattern areas 18a and 18b and their overlapping area 181 are shown in a corresponding manner.

The image point 12 is illuminated in the recording sensor 11 by the area 18, 18a, 18b of the pattern limited by the edge visual rays 15 (prior to being mirrored at the surface 10)/19 (after being mirrored at the surface 10), wherein this area 18, 18a, 18b is mapped on the pattern 13 across the reflection zones 17, 17a, 17b of the surface 10 in the recording device 7. Each of the visual rays 15 is however deflected according to the surface normals 16, 16', 16a, 16a'/16b, 16b' present in this spot.

In FIGS. 5a, 5b, 5c and 5d the situation in the first image of the sequence is depicted. Again the camera pixel 12 in the image sensor 11 is illuminated by the area 18 of the pattern delimited by the edge rays 15 (prior to being mirrored at the surface)/19a (after being mirrored at the surface), wherein this area 18 is mapped on the pattern 13 across the area 17a of the surface 10 in the camera. Now, however, the visual ray 15 is deflected according to the surface normals 16a/16b present in this spot. The situation in the respectively last image of each image recording sequence is shown in FIGS. 6a, 6b, 6c and 6d. Now the area 18b of the pattern 13 is mapped across the area 17b across the shifted surface 10 in the image point 12. Now the surface normals 16b, 16b' are relevant for the mirroring of the edge rays 15 emanating from the camera. Since these are different from those in the first image (FIGS. 5a, 5b, 5c and 5d), the area of the illumination pattern 130 in the illumination device 8, which is seen/mapped in the image point 12, is also shifted. In total, during the image sequence from the first to the last recording the image point 12 sweeps over the area 17 of the surface 10 in FIGS. 6a, 6b, 6c and 6d and thus over the entire area 18 of the pattern 13. The image point 12 sees the area, which is located both in the reflection zones 17a as well as 17b on the surface 10 and in the pattern areas 18a as well as 18b on the pattern 13. It, i.e. the image point 12, does not see the areas, which during the entire image sequence are only present in 17a or 17b/18a or 18b.

It should, however, be noted that the proportions in FIGS. 3a, 3b, 3c, 3d, 4a, 4b, 4c, 4d, 5a, 5b, 5c, 5d, 6a, 6b, 6c, 6d are not realistic. Nor do the cutting areas 171, 181 depicted with cross-hatching, respectively, correspond to realistic variables, but only serve illustrative purposes and to promote understanding. In fact, at least the pattern 13/the illumination pattern should be very much longer-wave compared to the depicted size of the image point 12, so that an image point 12 only covers a small fraction of a wavelength. If the proportions regarding size were realistic, the principle could no longer be recognised in the drawing.

As already explained, in an image recording sequence which is recorded for a multi-image phase shift process, the same spot of the surface 10, i.e. the same reflection zone 17, should really be mapped in all images in each image point 12. When several images are recorded one after the other, these are, relative to a moving surface 10, shifted from one another. What is decisive for the assessment as to whether that, which is recorded by an image point 12 during an image sequence, can still be regarded as "approximately the same spot" in terms of the invention, ultimately depends on to what extent the mapping of the periodic pattern 13 across the surface 10 in the recording device 7 changes during an image sequence. This in turn depends, on the one hand, on the pattern 13 (illumination pattern 130) itself and its distance from the surface 10, on the other hand on the reflection zone 17, which is mapped on the image point 12 during the entire image sequence, and how this area (reflection zone 17) changes. The area of the reflection zone depends on the optical pixel resolution (i.e. the area, which is mapped in the viewing plane on one pixel), the exposure time, the duration of the exposure sequence and the traversing speed (i.e. how far the surface 10 moves during a complete image sequence). Changes in the pattern area 18 depend on the surface topography (in particular on the change of the surface normal).

If the phase shift process is to be performed, the pattern 13 and the image point 12 (also in the case of a stationary surface 10) must be matched to each other such that in that part of the illumination pattern 130, which is covered by an image point 12 on the illumination pattern 130, the brightness can be regarded as almost constant/the medium brightness actually represents the brightness measured in the image point 12. Also the brightness is allowed to change to that extent that the brightness for the required minimum surface deflection (caused by a defect to be detected) changes sufficiently for the inspection device 9 to be able to perceive this. The former is the case, if the surface 10, which is covered by an image point 12 as reflection zone 19, can be regarded as almost planar. If this is not the case, a topographic measurement is no longer possible without further information; all that can still be detected is that a surface deviation exists. In addition the lateral resolution (i.e. the size of the area on the surface) must be adjusted such that the smallest surface deviations, which shall be identified during the inspection, are still resolved.

For the moving surface 10 it must further be taken into account that during the image recording sequence a larger area (entire reflection zone 17 on the surface 10 of FIGS. 4a, 4b, 4c, 4d e.g. 6a, 6b, 6c, 6d is covered by an image point. This impacts the lateral resolution. If the surface is additionally curved, a larger pattern area 18 on the pattern 13 is additionally covered by one image point. This impacts the depth resolution. If the surface 10 moves during the recording of images in the image recording sequence, the deciding factor is, how the respective visual ray 15, 19 of an image point 12 sweeps over the illumination pattern 130 (momentary recording of the pattern 13).

In the case of a planar surface 10 this effect does not occur anyway as per FIGS. 3 and 4. Thus errors do not occur because of mapping different recorded pattern areas in the images of a recording sequence. Albeit this only applies if there are no measuring errors in the undisturbed case. As soon as any fault occurs on the surface (or if this is curved anyway) this no longer applies. Therefore the case shown in FIGS. 5 and 6 also occurs in the case of measuring errors.

Due to the method according to the invention and the respective inspection device the system is laid out such that the above mentioned conditions are maintained also for exposure times/the entire recording time for a complete image recording sequence. To this end the images of an image recording sequence are recorded chronologically one of the other so quickly that the shifting of the surface 10 during the recording is so small that each image point 12 covers an area (reflection zone 17) on the surface 10, which can still be regarded as constant. Besides the period length of the pattern 31 is laid out such that the area, which is swept over by a visual ray 15, 19 of the recording device 7 mirrored or reflected at the surface during the recording of an image recording sequence, can still be regarded as constant/that the error arising therefrom is smaller than the required depth resolution.

The stronger the surface 10 is curved, the faster the images have to be recorded and the more long-wave the pattern 13 must become. However, both conditions must be maintained only for those areas on the surface 10, which are to be actually inspected. These are, in most cases, the constructively defect-free surface areas and those areas, in which flat, topographical long-wave defects exist. Most surfaces have moreover very small, mostly very steep topographical defects. With regard to these defects the conditions can no longer be maintained in most cases, wherein this applies mostly already for the static case. All that can be done here is detecting these defects (detecting of a defect), but measuring them (measuring the topography) is no longer possible.

Very high image recording frequencies are necessary for the method, in order for the required lateral resolution to be achieved for the entire image recording sequence. These in turn require very short exposure times, which in turn require very bright illumination.

For the phase-shift method used in a very advantageous manner in this context it is most advantageous, if the pattern 13 (i.e. each of the illumination patterns 130) is a sinusoidal brightness curve. This is typically achieved using e.g. screens or patterns projected on a surface. The sinus curve can be represented in a very good to perfect manner therewith. Unfortunately the brightness achievable at economically justified expense with these illuminations is often not sufficient, and the possible image frequency is limited so that they can only be used in slow processes.

With an LED line or an LED matrix, where individual LEDs or even individual LED modules, which consist of a number of single LEDs, can be separately controlled, both the required brightness and the required switching frequency can be realised, synchronised with the image recording of the cameras. Or a number of lines can be combined to form a matrix.

In the simplest form the individual LEDs/LED modules can only be switched on or off. This means that only a rectangular brightness curve can be realised, which is only a rough approximation of the actually desired brightness curve. This is already sufficient for performing the phase shift method, but the accuracy is limited. By taking various measures a better approximation to the desired curve can be achieved. The closer one comes to a sinusoidal curve, the better is the accuracy. The illumination line/illumination matrix can be modified such that intermediate brightnesses for individual LEDs can also be set. Depending on the size of the LEDs or LED modules a good approximation of the sinusoidal curve can thus be achieved. This is possible e.g. in that the individual LEDs/LED modules are only connected from time to time during the actual exposure time. However this method is expensive because extremely fast control electronics are then required. A solution preferred according to the invention provides for the pattern to be mapped blurred on the camera. This has already been described and is not repeated here.

It is pointed out that in terms of the above description the terms of camera and image recording device are used synonymously. All features and functions disclosed in relation to the camera apply correspondingly also for the image recording device and vice-versa.

LIST OF REFERENCE SYMBOLS

1 object
2 copper film
3 plastic film
4 first defect
5 second defect
6 movement direction
61 shift
7 recording device
8 illumination device
9 inspection device
10 surface
11 recording sensor
12 image point
13 pattern
130 illumination pattern
14 brightness distribution
15 visual ray
16 surface normal
17 reflection zone
170 reflection point
171 cutting area of the reflection zones of individual images
18 pattern area
181 cutting area of the pattern areas in individual images
19 visual rays
$\alpha$ reflection angle

The invention claimed is:

1. A method for optically inspecting a curved surface (10) of an object by means of an inspection device, said method providing the following steps:
   generating, by means of an illumination device of the inspection device, a temporally periodic pattern with different illumination patterns is on the surface during an image recording sequence and recording, during the image recording sequence a number of images of the pattern on the surface by means of an image recording device of the inspection device,
   wherein the illumination device and the image recording device are arranged in the reflection angle ($\alpha$) and wherein the object is moved relative to the inspection device during inspection of the surface;
   wherein generating one of the different illumination patterns is synchronised, respectively, with the image recording of one of the images of the pattern such that each image from the image recording sequence is recorded, respectively, with a known illumination pattern of the different illumination patterns;
   determining the phase of the pattern from the succession of recorded known illumination patterns in at least one image point;
   detecting defects on the surface from deviations of the illumination pattern recorded in at least one image from the generated known illumination pattern;
   wherein the duration of the image recording sequence is chosen such and the illumination pattern is generated by the illumination device such that the area of the illumination pattern visible in the image points of the images recorded during each image recording sequence can be regarded as constant by selecting the period length of the pattern in the illumination pattern such that, depending on a topology of the surface in direction of the pattern course, an intensity change does not exceed a selected criterion, so that a sequence reflection zone, which is defined as the surface area covered in total by the reflection zones in the respective images from the image recording sequence, can be regarded as constant.

2. The method according to claim 1, characterised in that the size of the image point (12) is set during the performance of the method.

3. The method according to claim 2, characterised in that setting the size of the image point (12) is done by combining several pixels of a recording sensor (11) of the recording device (7).

4. The method according to claim 1, characterised in that the duration of the image recording sequence is set during the performance of the method.

5. The method according to claim 4, characterised in that when setting the duration of the image recording sequence at least one of the variables listed hereunder is adapted:
   exposure time of an image
   brightness of the pattern (13) generated on the surface (10)
   scanning frequency of the recording sensor (11)
   number of images per image recording sequence.

6. The method according to claim 1, characterised in that the periodic pattern (13) is generated along the movement direction of the object (10), transversely to the movement direction of the object (10) or alternately along and transversely to the movement direction of the object (10).

7. The method according to claim 1, characterised in that the recording device (7) is focused such that the illumination pattern (130) recorded in the image is blurred.

8. The method according to claim 1, characterised in that during inspection of the surface (10) the three-dimensional topography of the surface (10) of the object (1) is determined by means of deflectometric processes.

9. A use of the method according to claim 8 for the inspection of web product or of treated surfaces (10).

10. An inspection device for optically inspecting a curved surface (10) of an object (1) with an illumination device (8) and a recording device (7), which are aligned to each other in such a way that a visual ray (15) emanating from the recording device (7) as a visual ray (19) reflected on the surface, is incident on the illumination device (8) then, when a surface normal (16) standing vertically on the surface (10) in the incident spot of the visual ray (15, 19) just halves the angle between the outgoing visual ray (15) and the reflected visual ray (19), wherein the illumination device (8) is designed to generate a temporally periodic pattern (13) with different illumination pattern (130) during an image recording sequence and the recording device (7) is designed to record images of the pattern (13) reflected on the surface (10) during the image recording sequence synchronously with the generation of the illumination pattern (130), wherein the inspection device (9) includes a computing unit for controlling the inspection device (9) and for avaluating the recorded images, characterised in that a processor of the computing unit is designed for performing the method according to claim 8.

11. The inspection device according to claim 10, characterised in that the illumination device (8) comprises individually controllable light elements arranged in a row or matrix and in that the recording device (7) comprises a sensor (11) for recording images mapped on the sensor (11) via a recording optics, wherein the sensor (11) comprises individual sensor pixels arranged in a row or a matrix.

12. The inspection device according to claim 10, characterised in that the recording device (7) and the illumination device (8) are arranged such that a flat viewing and illumination angle of less than 30° is provided between the respective visual ray (15, 19) and the surface (10) and/or in that a large illumination distance between the surface (10) and the illumination device (8) is provided, said distance being in the range between 1-fold and 10-fold the distance between the recording device (7) and the surface (10).

* * * * *